United States Patent [19]

Maxfield et al.

[11] Patent Number: 4,814,242

[45] Date of Patent: * Mar. 21, 1989

[54] ELASTOMERIC BINDERS FOR BATTERY ELECTRODES

[75] Inventors: MacRae Maxfield, Union; Taiguang R. Jow, Morris; Lawrence W. Shacklette, Essex, all of N.J.

[73] Assignee: Allied-Signal Inc., Morris Township, Morris County, N.J.

[*] Notice: The portion of the term of this patent subsequent to May 26, 2004 has been disclaimed.

[21] Appl. No.: 107,313

[22] Filed: Oct. 13, 1987

[51] Int. Cl.$^4$ .................... H01M 4/62; H01M 4/60
[52] U.S. Cl. ............................ 429/217; 429/194; 429/213
[58] Field of Search .................. 429/194, 213, 217

[56] References Cited

U.S. PATENT DOCUMENTS

| | | | |
|---|---|---|---|
| 4,172,319 | 10/1979 | Bloom et al. | 429/154 X |
| 4,358,390 | 11/1982 | Coulombeau et al. | 429/217 X |
| 4,552,821 | 11/1985 | Gibbard et al. | 429/217 X |
| 4,560,633 | 12/1985 | Kobayashi et al. | 429/234 X |
| 4,668,596 | 5/1987 | Shacklette et al. | 429/213 X |

Primary Examiner—Stephen J. Kalafut
Attorney, Agent, or Firm—Richard C. Stewart, II; Gerhard H. Fuchs

[57] ABSTRACT

This invention relates to a novel anode for use in batteries, and to batteries containing the anode, which anode comprises one or more anode active materials and an elastomeric binder.

27 Claims, 3 Drawing Sheets

ELASTOMERIC BINDERS FOR BATTERY ELECTRODES

BACKGROUND OF THE INVENTION (1) Field of the Invention

This invention relates to negative battery electrodes composed of finely divided active materials. A preferred aspect of this invention relates to negative electrodes for ambient temperature nonaqueous secondary batteries composed singly or in combination of conjugated backbone polymers and alkali metal alloying or alkali metal ion inserting materials.

(2) Prior Art

The use of elastomeric binders for cathodes are known. For example, S. P. S. Yen, et al., "Elastomeric Binders for Electrodes," *J. Electrochem. Soc.*, 130, p. 1107 (1983) describes the use of ethylene propylene diene terpolymer as a binder for cathodes. In particular, cathodes for which elastomers are useful as binders are finely divided alkali metal intercalation compounds. Examples of intercalation compounds are found in European patent No. 0070107 A1; Murphy et al., *J. Electrochem. Soc.*, 126, 349 (1979) and Murphy et al., *Mat. Res. Bull.*, 13, 1395 (1978) which disclose batteries based on lithium intercalation in layered dichalcogenides.

Negative electrodes for non-aqueous batteries composed of alkali metal alloys are known. For example, U.S. Pat. No. 4,002,492 discloses electrochemical cells having an anode consisting essentially of lithium aluminum alloys that contain lithium in amounts between about 63% and 92% and the balance essentially aluminum. Anodes composed of lithium and aluminum are also disclosed in Rao, et al., *J. Electrochem. Soc.* 124, 1490 (1977), and Besenhard, *J. Electroanal. Chem.*, 94, 77 (1978).

Conjugated backbone polymers, e.g., polyacetylene, polyphenylene, polyacenes, polythiophene, poly(phenylene vinylene), poly(alkoxyphenylene vinylene), poly(furylene vinylene), poly(thienylene vinylene), polyazulene, poly(phenylene sulfide), poly(phenylene oxide), polythianthrene, poly(phenylquinoline), polyaniline, polythiophene, and polypyrrole, have been suggested for use in a variety of applications based upon their characteristic of becoming conductive when oxidized or reduced either chemically or electrochemically. The secondary btttery application described by, e.g., MacDiarmid et al. in U.S. Pat. No. 4,321,114 (1981); *J. de Physique*, Colloque C3, Vol. 44 (1983), articles beginning on page 579, page 615 and page 537; and K. Kaneto et al., *Japanese J. of Applied Physics*, Vol. 22, pp. L567–L568 (September 1983) and pp. L412–L414 (July 1983), employs one or more electrodes having conjugated backbone polymers as the electroactive material. Such electrodes can, for example, be reversibly complexed with alkali metal or tetraalkylammonium cations during battery cycling, most commonly with insertion of cations into a polymer anode (the negative battery electrode) occurring during charging. The more such cations are inserted, the more conductive the electrode becomes and the more cathodic the potential of the anode becomes.

Composite structures of a conjugated backbone polymer and a non-electroactive material have been described in U.S. Pat. No. 4,294,304 and in the above *J. de Physique* issue, articles beginning on page 137 and on page 151. Representative other components that have been blended with polyacetylene or onto which polyacetylene or polypyrrole have been deposited include polyethylene, polystyrene, graphite, carbon black, NESA glass and silicon. In selected instances, such composite structures have been suggested for use in batteries, see Showa Denko K.K., European published patent application 76,119 (1982). U.S. Pat. No. 4,668,596 described anodes for secondary batteries which comprises a mixture of a conjugated backbone polymer and another electroactive material selected from the group consisting of metals which alloy with alkali metals and alkali metal cation inserting materials as for example, transition metal chalcogenides.

SUMMARY OF THE INVENTION

The present invention is directed to a novel anode which comprises one or more electroactive anode materials dispersed in an "elastomeric binder." As used herein, electroactive anode materials are solids that undergo reversible electrochemical oxidations at potentials more negative than about $+1.8$ V vs. $Li/Li^+$ (or $-1.3$ V vs. $Ag/Ag^+$. As used herein, an "elastomeric binder" is a polymer that exhibits elastic response to mechanical deformations and that is chemically compatible with other battery components (e.g., electroactive materials, electrolyte, current collector). The present invention also provides a battery incorporating the anode of this invention, which battery comprises:

(a) a cathode;

(b) an electrolyte; and (c) an anode comprising one or more anode active materials dispersed in one or more elastomeric binders.

A particularly preferred embodiment of the battery of this invention comprises:

(a) a cathode;

(b) an electrolyte comprising an organic solvent and an alkali metal salt; and (c) an anode comprising an elastomeric binder having dispersed therein one or more anode active materials selected from the group consisting of conjugated backbone polymers capable of inserting alkali metal cations, conjugated backbone copolymers, capable of inserting alkali metal cations, blends of said conjugated backbone polymers, or copolymers with one or more conjugated or non-conjugated backbone polymers, metals capable of alloying with the alkali metal in said electrolyte and an alkali metal cation inserting materials capable of inserting alkali metal cations in said electrolyte; said alkali metal cations being introduced into said anode as a metal alloy or as an inserted ion in said cations inserting material polymers or copolymers during the charging of said battery.

DESCRIPTION OF THE PREFERRED EMBODIMENTS

As an essential component, the battery of this invention includes an anode which comprises a mixture of one or more elastomeric binders and one or more anode-active materials. Elastomeric materials for use in the practice of this invention may vary widely, the only requirement being that the elastomeric materials of choice are stable to the anode active material of choice and exhibits elastic response to mechanical deformations.

Illustrative of useful elastomeric materials are polymeric hydrocarbons prepared by the polymerization of alkenes, having two or more double bonds that are either conjugated or non-conjugated, alone or with one or more other copolymerizable ethylenic monomers. Examples of alkenes having two or more conjugated double bonds are 1,3-butadiene, 2-tert butyl-1,3-butadiene, 1,3,5-hexatriene, 2-methyl-1,3-butadiene (Isoprene), 2,3-dimethyl-1,3-butadiene, 1,3-pentadiene, 1,3-hexadiene, 2-propylbutadiene and the like. Examples of alkenes having non-conjugated double bonds are 1,5 cyclooctadiene, 5-ethylidene-norbornne and the like. Examples of ethylenic monomers are ethylene, propylene, isobutylene, 1-pentene, methylstyrene, 4-methylstyrene, 4-phenylstyrene, 3-methyl-1-butene, 1-pentene, 4-methyl-1-pentene, 2-methylstyrene, 1-octadecene, 1-hexane, 4-methyl-1-pentene, ethylvinyl benzene, vinylnaphthalene, divinylbenzene, vinylcyclohexane, vinylcyclopentane, and the like.

Also illustrative of useful elastomeric materials are homopolymers and copolymers of the above-described copolymerizable ethylenically unsaturated monomers such as ethylene/propylene copolymer, styrene butadiene copolymer, styrene/methylstyrene, styrene/isoprene copolymer, ethylene/propylene/butadiene, ethylene propylene/isoprene, and the like.

Other useful elastomers include polyethers such as poly(ethylene oxide), poly(propylene oxide), poly(styrene oxide), poly(3-methoxypropylene oxide), poly(tetrahydrofuran), poly(3-phenoxypropylene oxide), and the like.

Still other useful elastomeric materials include aliphatic polyesters, copolymers, and polymers of ethylenically unsaturated ethers and esters. Illustrative of aliphatic polyesters are poly(ethylene succinate), poly(ethylene adipate), poly(tetramethylene adipate), poly(ethylene azelate), poly(propylene sebacate), poly(ethylene sebacate), poly(decamethylene adipate), poly(decamethylene sebacate) and the like. Illustrative of useful polymers and copolymers of ethylenically unsaturated ethers, esters, and ketones are those derived from vinyl butyl ether, 2-ethylbutyl acrylate, 2-ethylbutyl methacrylate, vinylethyl ether, vinylisobutylether, vinyloctylether, vinylbenzoate, methylisopropenyl ketone, isopropylacrylate, tert-butylacrylate, isobutylacrylate, isobutylmethacrylate, cyclohexylmethacrylate, sec-butylacrylate, tert-butyl methacrylate, tert-butylacrylate, and vinyl methyl ketone.

Preferred for use in the practice of this invention are elastomers which are unreactive to materials having electrochemical potentials as low as $+0.1$ V vs. $Li/Li^+$. Illustrative of other preferred elastomers are hydrocarbon polymers and copolymers such as those derived from polymerization and copolymerization of 1,3-dienes, such as 1,3-butadiene, 2-methyl-1, 3-butadiene and the like; and olefins such as ethylene, isobutylene, propylene, styrene and the like; and polyethers such as vinyl butyl ether, vinylisobutyl ether and the like. Polyethers exhibit stability at low potentials and hydrocarbon polymers are particularly stable at very low potentials.

Particularly preferred elastomers are those selected from the group of hydrocarbon polymers, copolymers, and polyethers which are solution or melt processible and which are swelled by, but insoluble in electrolytes, preferably solution processible that are soluble in hydrocarbon solvents. Examples of such preferred hydrocarbon elastomers are polyisobutylene, ethylene-propylene-diene monomer copolymers (EPDM rubbers), and poly(1,3-butadiene).

Amongst these particularly preferred embodiments of the invention, most preferred are those embodiments in which the elastomers are selected from the group consisting of hydrocarbon polymers and copolymers that can be crosslinked in a "cure" step following electrode fabrication. Such polymers and copolymers are preferably those containing isolated double bonds either in the chain or in a pendant group. Examples of these are polymers are polymers or copolymers formed from diene monomers, such as 1,3-butadiene, 2-methyl-1,3-butadiene, 5-ethylidene norbornene, and 1,5-cyclooctadiene.

Elastomers for use in the practice of this invention may be obtained from commercial sources or prepared by known techniques. For example, poly(butadiene-co-styrene) can be obtained commerically under such names as GR-S 1000, GR-S 1500, GR-S 1600, GR-S 2000, GR-S 2101 and the like. The preferred hydrocarbon elastomeric materials, such as ethylene-propylene-diene monomer (eg. 5-ethylidyl norbornene) copolymers known as EPDM rubbers can be prepared in various monomer ratios, and can be obtained commercially from Copolymer Rubber and Chemical Corp., and Exxon Corp.

As a second essential ingredient the anode comprises an "anode active" material. As used herein, an anode active material is a material which undergoes reversible electrochemical oxidation preferably at potentials in the range of 0 and $+1.8$ V vs. $Li/Li^+$. Such materials include electroactive metals and alloys, cation inserting polymers, and inorganic cation inserting compounds.

Useful electroactive metals include alkali metals, alkaline earth metals, and certain metals from Group III and Group IV of the Periodic Table. Illustrative of such metals are sodium, lithium, potassium, calcium, rubidium, cesium, barium, magnesium, aluminum, and the like.

Useful alloys include those formed with alkali metals and one or more other metals which are capable of being de-alloyed and re-alloyed by electrochemical oxidation and reduction, respectively, in the presence of alkali metal salt electrolytes. Illustrative of such useful alkali metal alloying metals are aluminum, lead, magnesium, tin, bismuth, antimony, silicon, indium, gallium, cadmium, and alloys of these or other metals, such as Al-Si, PbSn, Al-Mg, Al-Si-Sn, or Wood's Metal (Bi-Pb-Sn-Cd) and the like. The preferred alkali metal alloying metals for use in the practice of this invention are aluminum, lead, tin and alloys thereof. The particularly preferred metals are aluminum and lead for lithium alloys, and lead, tin, and tin/lead for sodium alloys.

Useful polymer cations inserting polymers may be any of the variety of conjugated backbone polymers known to those of skill in the art for use as negative electrodes in batteries. Such polymers are preferably conductive in their reduced form and capable of reversibly inserting cations. Useful polymers are also insoluble or substantially insoluble in the electrolyte. Useful conjugated backbone polymers may be conjugated backbone homopolymers or copolymers, or blends of one or more conjugated backbone homopolymers or copolymers with one or more conjugated backbone or non-conjugated backbone homopolymers or copolymers. Useful conjugated backbone polymers can vary widely and include polyacetylene, poly(p-phenylene), polyacene, polyacenediyl, polyazulene, poly(phenylene vinylene) poly(dialkoxyphenylene vinylene), poly(furylene vinylene) and the like, and blends thereof with other polymers having either conjugated or non-conjugated backbones. All of these polymers have conjugated unsaturation along their main backbone chain. Such conjugated polymers are preferably employed in the present invention in any dispersed or dispersible form such as, for example, a liquid suspension or solution, foams, compacted or uncompacted powders, or as powders dispersed in a suitable carrier matrix, e.g., another organic polymeric material. Amongst these illustrative conjugated backbone polymers, polyacetylene, poly(phenylene vinylene) and poly(p-phenylene) are preferred, and polyacetylene and poly(p-phenylene) are particularly preferred.

Useful conjugated backbone polymers are known compounds which can be prepared by conventional means. For example, high quality polyacetylene, a preferred conjugated backbone polymer, can be conveniently prepared by the procedures described in a series of papers by Shirakawa, et al., *Polymer Journal*, Vol. 2, No. 2, pp. 231–244 (1971); *Polymer Journal*, Vol. 4, No. 4, pp. 460–462 (1973); *Journal of Polymer Science Part A*-1, Polymer Chemistry Edition, Vol. 12, pp. 11–20 (1974), and *Journal of Polymer Science Part A*-1, Polymer Chemistry Edition Vol. 13, pp. 1943–1950 (1975), all of which are incorporated herein by reference. Moreover, forms of high quality poly(p-phenylene), another preferred conjugated backbone polymer, can be prepared by the method of Kovacic described in detail in *J. Am. Chem. Soc.* 85, 454–458 (1963), incorporated herein by reference. Furthermore, poly(phenylene vinylene), another preferred conjugated backbone polymer, can be prepared by the procedure described in U.S. Pat. No. 3,404,132 of R. A. Wessling et al.

Useful anode active materials also include inorganic alkali metal cation inserting materials. As used herein, "alkali metal cation inserting materials" are materials into which alkali metal cations can be inserted, as for example, into channels in the material, between layers of the material and the like. Such materials are known to those of skill in the art. Illustrative of such materials are graphite and transition metal chalcogenides. Preferred materials are transition metal chalcogenides such as $Li_xWO_2$, $Li_xMoS_2$, $Li_xTiS_2$, $Li_{1+x}VSe_2$, $Li_xFeCuS_2$, and the like where $0<x<1$.

In the preferred embodiments of the invention, the useful anode materials include mixtures of two or more of the aforementioned anode active materials as for example, the anode active materials described in U.S. Pat No. 4,668,596. Illustrative of such material mixtures are mixtures of Li/Al, Li/Pb, Na/Pb alloys with either polyacetylene or poly(p-phenylene), sodium metal with poly(p-phenylene), $Li_{1+x}TiS_2$ ($0<x<1$) or $Li_xWO_2$ ($0<x<1$) with either polyacetylene or poly(p-phenylene) and the like.

The preferred anodes of this invention comprise an elastomeric binder and one or more anode active materials selected from the group consisting of alkali metal alloy, conjugated backbone polymers and copolymers, and an inorganic cation inserting material. The more preferred anodes comprise a combination of an elastomer with a conjugated backbone polymer and an inorganic anode active material. The particular elastomer and conjugated backbone polymer, alloying metal and/or cation inserting material chosen for use in any particular situation may vary widely. However, in the preferred embodiments of the invention the conjugated backbone polymer and other electroactive material(s) are selected such that the range of electroactivity of the polymer encompasses or closely matches that of the other component. The elastomer is preferably chosen such that it is chemically unreactive toward the other components throughout their range of electroactivity in the battery.

The following table lists exemplary combinations of conjugated backbone polymer and alkali metal alloying metal or alkali metal cation inserting material which can be used in the improved anode of this invention.

| POLYMER | POLYMER ELECTRO-ACTIVE RANGE* | ELECTRO-ACTIVE MATERIAL** | ELECTO-ACTIVE RANGE* |
|---|---|---|---|
| PA, polyacetylene | 0.1–1.8 V | $Li_xAl$ | 0.2–0.5 V |
| PPP, polyphenylene | 0.1–1.1 V | $Li_xMg$ | 0–0.2 |
| PPP, polyphenylene | 0.1–1.1 V | $Na_yPb$ | 0.3–0.9 |
| PPP, polyphenylene | 0.1–1.1 V | $Li_yWO_2$ | 0.3–1.2 |
| PPQ, poly(phenylquinoline) | 1.5 V | $Li_xMoO_2$ | 0.8–1.8 |
| PPV, poly(phenylene vinylene) | 0.1–1.4 V | $Li_{1+x}TiS_2$ | 0.5–0.6 |
| PAZ, polyazulene | *** | $Li_{1+x}VSe_2$ | 1.0–1.3 |
| PFV, poly(furylene vinylene) | 1.2–1.5 | $Li_xFeCuS_2$ | 1.5 |

*Relative to $Li/Li^+$ reference.
**where $0 < x < 1$, $0 < y < 3.75$

The table shows that a combination of polyacetylene and the alloying metal, aluminum (Al), and combinations of poly(phenylene) and the lithium cation inserting material $WO_2$, and poly(phenylquinoline) and the inserting material $MoO_2$ are combinations of polymers and alloying metal or inserting materials which would be expected to provide good results. The polyether elastomeric materials such as poly(ethylene oxide) and poly(tetrahydrofuran), may be chemically compatible with higher potential anode materials, such as poly(phenylquinoline) and $Li_{1-x}VSe_2$, and chemically unstable to lower potential anode materials such as $Li_xMg$ and highly reduced poly(p-phenylene). The hydrocarbon polymers are expected to be chemically compatible with all of the materials in the Table.

The structure of the anode can be varied widely. For example, the anode can be in the form of an intimate mixture of one or more anode active powders dispersed in the elastomer binder. Alternatively, the anode can be in the form of a film of the conjugated backbone polymer impregnated with another active component in finely divided form and reinforced by elastomeric binder, or in the form of a composite layered structure in which one of the components is a core structure encapsulated by and an intimate contact with the other components. In the preferred embodiments, the anode is a composite in the form of an intimate mixture of anode active powders comprising at least one conjugated backbone polymer and at least one other electroactive material mixed throughout with elastomer binder and compressed into a cohesive film.

Each component of a preferred composite anode contributes to high performance in the battery of this invention. Powdered metals, alloys, and cation inserting materials contribute high charge capacity accessible over narrow potential ranges. Conjugated backbone polymers in compressed powder, film, gel, or foam form, contribute electrical and ionic conductivity, charge capacity and some degree of cohesiveness and elasticity necessary to maintain the anode's mechanical integrity throughout dimensional changes engendered by battery cycling. Elastomers forming a matrix or network throughout the composite anode contribute improved cohesiveness and elasticity so that the anode resists disintegration during extreme dimensional changes of the anode active components. In addition, elastomers impart enhanced flexibility to anodes, which flexibility is necessary for some battery fabrication procedures. Elastomers that are swelled by the electrolyte of the battery facilitate enhanced ionic conductivity through the anode.

The amounts of the various components can vary widely, depending on a number of factors, as for example, the balance chosen between electrochemical performance, and the desired mechanical properties of the anode. In general, the electrochemical charge capacity increases with increasing content of inorganic anode materials i.e., metal and/or inorganic inserting materials, while mechanical strength, fexibility and cohesiveness increases with increasing elastomer binder content. Usually, the amount of inorganic anode material may vary from about 4 to about 95% by weight of the anode components (excluding other components such as conductivity aids, mechanical supports, and the like). In the preferred embodiments of the invention, the amount of inorganic anode material may vary from about 60 to about 90% by weight on the aforementioned basis. Similarly, the amount of elastomer binder usually varies from about 1 to 10% by weight and, in the preferred embodiments, may vary from about 1 to about 5%. Finally, the amount of conjugated backbone polymer may vary from 0 to about 95% and, in the preferred embodiments, may vary from about 10 to about 35% by weight.

The anode may include other optional materials known to those of skill in the battery art. These materials are known to those of skill in the art and will not be described herein in great detail. In brief, by way of illustrative examples, the anode may include such other substituents as conductivity aids, mechanical supports, and the like. However, in the preferred embodiments, the combination of polymer plus other electroactive material is in the major proportion.

In cases where the anode contains conjugated backbone polymer, the anode may also be coated with other materials to allow use of the anode with solvents which would otherwise react with the conjugated backbone polymer in the reduced state. For example, the anode can be coated with the reaction product of an oxirane compound as described in U.S. Pat. No. 4,472,487, with the reaction product of an organsulfur compound as described in U.S. Pat. No. 4,472,489 and with the reaction product of certain cyclic compounds as described in U.S. Pat. No. 4,472,488. Each of these patents are incorporated herein by reference.

The method of fabricating the preferred anode is not critical and can be varied widely. Any method known to those of skill in the art for fabricating composites of polymer and a metal or alkali metal ion inserting material can be used. In the preferred embodiments, the anode is composed of an intimate mixture of compressed powders. In the preferred embodiments, where the anode is composed of powdered anode active material(s) dispersed in elastomer matrix, the anode is generally fabricated by mixing a slurry of powdered anode active materials in a solution of elastomer dissolved in a chemically compatible solvent; casting the slurry in a mold and removing the solvent; and compressing the molded composite for improved cohesiveness and uniformity.

Additional improvements in performance of composite anodes are obtained if the conjugated backbone polymer and inorganic components are bonded together in a fabrication step preceding the slurry preparation as disclosed in U.S. patent application Ser. No. 895,596. The bonding procedures include derivatizing the surface of the inorganic component with a polymerization catalyst; and dispersing the derivatized inorganic material in a reaction mixture leading to the formation of a desired conjugated backbone polymer. This patent application is incorporated herein by reference.

The organic solvents which may be included in the electrolyte of the batteries of the present invention may vary widely and can be organic solvents normally used in batteries. Preferably, these solvents should be electrochemically inert to oxidation and reduction during use while simultaneously being capable of dissolving the desired alkali metal salt and providing ionic conductivity equal to or in excess of $10^{-4}$ S/cm. Examples of such useful organic solvents include propylene carbonate, ethylene carbonate, sulfolane, methyl sulfolane, dimethyl sulfolane, 3-methyl-2oxazolidone, alkane sultones, e.g., propane sultone, butane sultone (the use of sultones as electrolyte compositions is the subject of a related, commonly assigned U.S. Pat. No. 4,528,254, and the use of sultones for coatings on polymer anodes is the subject of a related, commonly-assigned U.S. Pat. No. 4,472,489, dimethyl sulfoxide (DMSO), dimethyl sulfite, tetrahydrofuran (THF), 2-methyltetrahydrofuran (2-MTHF), dioxane, dioxolane, 1,2-dimethoxyethane (DME), dimethoxymethane, diglymes, glymes, methyltetrahydrofurfuryl ether, anisole, nitriles, (e.g., proprionitrile, butyronitrile, acetonitrile, benzonitrile), dichloromethane, tetraethylsulfamide, aromatic hydrocarbons, e.g., toluene, benzene, organo phosphorus compounds, e.g., hexamethylene phosphoramide, and trimethyl phosphate. Mixtures of such available organic solvents may also be used, such as mixtures of sulfolane and acetonitrile, or mixtures of propylene carbonate and dimethoxyethane.

The organic solvents chosen for use in any particular situation will, of course, depend upon many factors such as the precise electrolyte composition used and the voltage range desired, as well as the choice of cathode and other components of the battery used. A particularly important consideration in choosing a solvent is whether the conjugated backbone polymer employed is subject to attack by the solvent. In the preferred embodiments of the invention when uncoated anodes are employed, ether-type solvents such as tetrahydrofuran, dimethoxyethane, diglyme, 2-methyltetrahydrofuran and mixtures thereof are employed because these solvents are generally not reactive with conjugated backbone polymers, when in their neutral or reduced forms. Essentially, any of the above-listed solvents can be used with anodes coated with solvent-resistant coatings; however, preferred for use with coated anodes are propylene carbonate, ethylene carbonate, sulfolane, 3-methylsulfolane and mixtures of any of the above-listed solvents, which mixtures may also include glymes, particularly dimethoxyethane.

The electrolyte includes a compound which is ionizable during the operation of the cell into an anionic and a cationic species, which may, depending on the nature of the anode active material, insert into the conjugated backbone polymer or inorganic material, or form a metal alloy with anode active metals during the operation of the battery. For example, upon operation of a cell using a conjugated backbone polymer as all or part of the negative electrode, the polymer becomes doped with a cationic dopant species to a n-type material. Similarly, if the positive electrode is also formed totally or in part from such a polymer, the polymer in this electrode is doped with an anionic species to a p-type material. A wide variety of ionizable compounds for forming anionic and cationic dopant species may be suitably be employed, either individually or in combination. Illustrative of such materials are the salts of alkali metals and alkali earth metals with anions such as for example, halides, $PF_6^-$, $ClO_4^-$, $AlCl_4^-$, $FeCl_4^-$, $SO_3CF_3^-$, $BF_4^-$, $BCl_4^-$, $NO_3^-$, $POF_4^-$, $SCN^-$, $CN^-$, $AsF_6^-$, $SbF_6^-$, $CF_3CO_2^-$, $C_6H_5CO_2^-$, p-$CH_3C_6H_4SO_3^-$, $HSO_4^-$, and like salts of such metals.

In the preferred embodiments of this invention, where the anode is a composite comprised of one or more conjugated backbone polymers and one or more electroactive materials selected from the group consisting of metals which alloy with alkali metals and alkali metals cation inserting materials, salts for use in the electrolyte of the preferred battery of this invention are of the formula:

MA wherein:

M is an alkali metal; and

A is a species which is anionic in the electrolyte and stable under operational conditions. Preferred alkali metals are lithium, sodium and potassium, and the particularly preferred alkali metals are lithium and sodium. Suitable anionic species include $I^-$, $Br^-$, $Cl^-$, $ClO_4^-$, $PF_6^-$, $AsF_6^-$, $SO_3CF_3^-$, $BF_4^-$, $BCl_4^-$, $AlCl_4^-$, alkylborates, arylborates and alkylarylborates such as $B(CH_3)_4^-$, $B(C_6H_5)_4^-$, and the like (the use of such borate salts with conjugated polymers being the subject of commonly assigned U.S. Pat. No. 4,522,901 which is incorporated herein by reference). Preferred anions are alkylborates, arylborates, alkylarylborates, $PF_6^-$, $ClO_4^-$, halide ions, $SO_3CF_3^-$, and $BF_4^-$, and particularly preferred anions are alkylborates, arylborates, alkylarylborates and $PF_6^-$, with $PF_6^-$ being the anionic species of choice.

Molten salts may also be employed as the electrolyte of the battery of the invention. The use of conjugated polymers as anodes in room-temperature molten salt batteries is described in the commonly-assigned U.S Pat. No. 4,463,071, which is incorporated herein by reference. Room-temperature molten salts suitable for use in batteries of this invention include alkali metal halide-trialkylimidazolium chloroaluminate, alkali metal halide-dialkylimidazolium chloroaluminate, and alkali metal halide alkyl pyridinium chloroaluminate. Since in many cases the polymers, alloys, and other ion inserting materials of this invention are stable at elevated temperature, intermediate temperature molten salts (M.P.<200° C.) such as $NaAlCl_4$ or $KAlCl_4$, are also suitable for use.

Cathodes for use in the practice of this invention are not critical and can be varied widely. Suitable cathodes include a material selected from the group consisting of graphite, intercalation compounds of graphite, high surface area carbons (>200 m²/g), transition-metal chalcogenides, and conjugated backbone polymers which are capable of being oxidized (acceptor-doped). Transition-metal chalcogenides and conjugated backbone polymers are preferred cathode materials.

The transition-metal chalcogenides, suitable as cathode materials useful in this invention, can contain inserted alkali metals and include the transition-metal dichalcogenides such as $TiS_2$ and, among others, those listed on page 392 of "Lithium Batteries" edited by J. P. Gabano (Academic Press, 1983) and in K. M. Abraham, Solid State Ionics, vol. 7, pp. 199–212 (1982) (both incorporated herein by reference). These include (with approximate open circuit potentials measured in various organic electrolytes when fully charged or devoid of inserted cations):

| | |
|---|---|
| $Na_xTiS_2$ | 2.1 V versus $Na/Na^+$ |
| $Na_xNbS_2Cl_2$ | 2.2 V versus $Na/Na^+$ |
| $Li_xMoS_2$ | 2.3 V versus $Li/LI^+$ |
| $Li_xFe_{0.25}V_{0.75}S_2$ | 2.4 V versus $Li/Li^+$ |
| $Li_xTiS_2$ | 2.5 V versus $Li/Li^+$ |
| $Li_xMoS_3$(amorphous) | 2.5 V versus $Li/Li^+$ |
| $Na_xCr_{0.5}S_2$ | |
| $Na_xWO_{3-y}$ | 2.6 V versus $Na/Na^+$ |
| $Na_xMoS_3$(amorphous) | 2.7 V versus $Na/Na^+$ |
| $Na_xTaS_2$ | 2.7 V versus $Na/Na^+$ |
| $K_xWO_{3-y}$ | |
| $Li_xMoO_3$ | 2.8 V versus $Li/Li^+$ |
| $Li_xV_6O_{13}$ | 2.9 versus $Li/Li^+$ |
| $Li_xCr_{0.5}V_{0.5}S_2$ | 2.9 V versus $Li/Li^+$ |
| $Li_xW_{0.2}V_{2.8}O_7$ | 3.0 V versus $Li/Li^+$ |
| $Li_xCu_2V_2O_7$ | 3.2 V versus $Li/Li^+$ |
| $Li_xCr_3O_8$ | 3.6 V versus $Li/Li^+$ |
| $Li_{1+x}V_3O_8$ | 3.7 V versus $Li/Li^+$ |
| $Na_xCoO_2$ | 3.7 V versus $Na/Na^+$ |
| $Li_x(a-V_2O_5-P_2O_5)$ | 3.7 V versus $Li/Li^+$ |
| $Li_xCoO_2$ | 4.7 V versus $Li/Li^+$ |
| wherein $0 < x < 2$ | |

Suitable polymer cathodes include oxidized polyacetylene, poly(p-phenylene), polyacenes, poly(phenylene vinylene), polyazulene, polynaphthalene, poly(phenylene sulfide), poly(phenylene oxide), polyphenothiazine, polyaniline, polypyrrole, polythiophene, polythianthrene, poly(thienylene vinylene), poly(furylene vinylene), and substituted versions of the above. Such polymers may be coated by reaction, when oxidized, with pyrroles, thiophenes, azulenes, oxiranes, anilines or furans, as described in commonly-assigned U.S. Pat. No. 4,472,987, the disclosure of which is incorporated herein by reference.

The secondary battery of this invention can be charged and discharged in accordance with the procedure described in U.S. Pat. No. 4,321,114. Such procedures are well known to those of skill in the art and will not be described herein in any great detail.

The following specific examples are presented to more particularly illustrate the invention and are not to be construed as limitations therein.

EXAMPLE I

Poly(p-phenylene) (PPP) 20 weight percent (w/o) was well mixed with $Na_{3.75}Pb$ 80 w/o. A one-percent solution of ethylene-propylene-diene copolymer obtained from Copolymer Rubber and Chemical Corp. under the tradename EPsyn 5206 (EPDM) in cyclohexane was prepared separately. This EPDM solution was added to the PPP/$Na_{3.75}Pb$ mixture such that the content of EPDM was about 4 weight percent (w/o) of the total weight. A spatula was used to mix the EPDM solution and the powder mixture. When the final mixture reached the state of a pasty slurry, it was spread on expanded nickel mesh. The electrode dried and compressed by rolling. The electrode had an area of 0.96 ($1.6 \times 0.6$) $cm^2$ with a thickness of 0.025 cm (including the Ni expanded metal). The weight of this electrode (excluding Ni expanded metal) is 40 mg.

The electrode prepared as above was cycled against a sodium counter electrode in $NaPF_6$/DME electrolyte. The electrode achieved a capacity of 10.3 mAh (cycled between 0.6 and 0.05 V, vs. Na/Na+) at a rate of 1 mA/$cm^2$. Based on the dimensions and weight of this electrode, the capacity per unit volume was 430 mAh/$cm^3$ (including expanded Ni metal) or 234 mAh/g (excluding expanded Ni metal). The utilization of Na in $Na_xPb$ was over 90% of the capacity theoretically obtained over the voltage range employed, $1 < x < 3.75$. The electrode was cycled for 150 times at a rate of 2 mA/$cm^2$ with only 8% capacity loss. When disassembled, the electrode was found slightly swelled but retained its integrity.

EXAMPLE II

Lithium-lead alloy (8.0 g of $Li_{4.3}Pb$) and poly(p-phenylene) (PPP, 1.75 g), both in powdered form (ca. −200 mesh), were stirred together in 10 g of cyclohexane-toluene solution of EPDM (2.5% polymer by weight) to form a uniform slurry. The slurry was poured onto a teflon sheet and spread to form a 2.5 mm deep pool. A grid of expanded Ni foil was immersed in the pool and the solvent in the pool was allowed to evaporate at 20° C. in Ar until a dry film was formed with the grid embedded in it. The film was uniform in thickness and composition but exhibited a granular surface that cracked and shed material when the film was flexed. Compressing the film at 0.5-2.0 metric tons per $cm^2$ by passing it between a steel plate and a roller gave the film a smooth surface that resisted cracking and shedding when it was repeatedly flexed and kinked. The compressed film was 0.3 mm thick and contained 60 mg of $Li_{4.3}$Pb-PPP-EPDM composite per $cm^2$.

Figure 1:
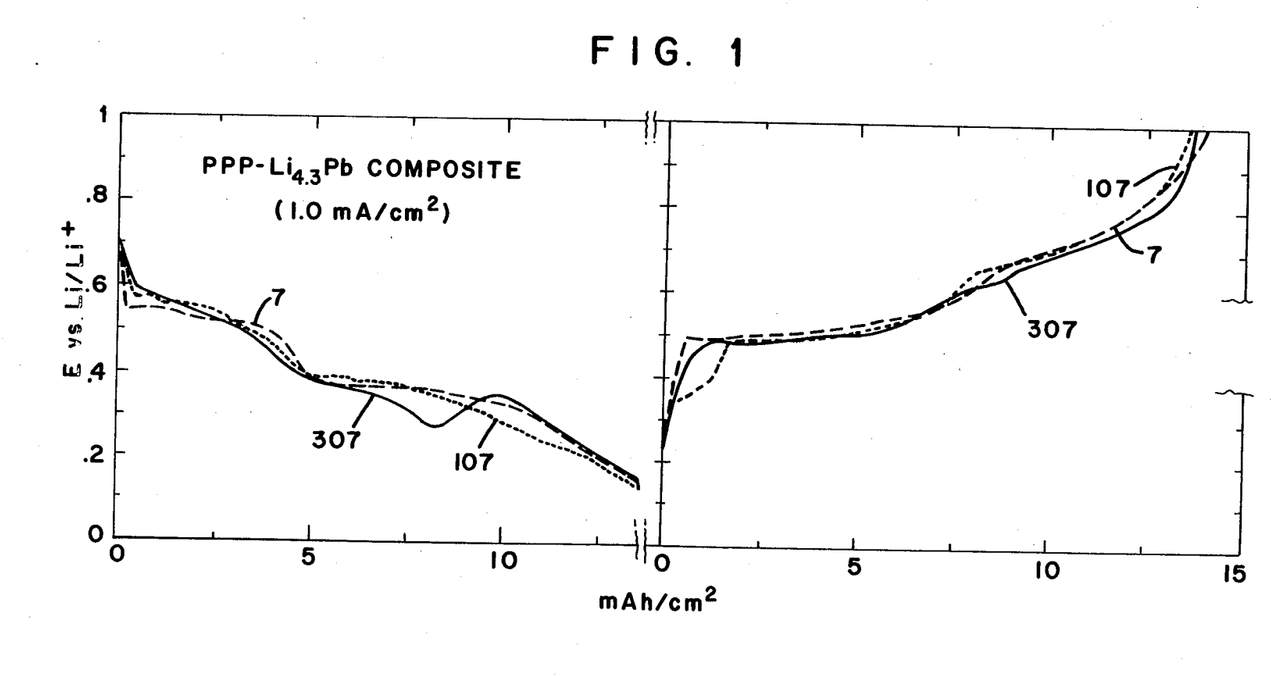
FIG. 1 is a graph of voltage vs. capacity for the battery of Example II at a voltage of from 0.1 to 0.8 volts.
Figure 2:
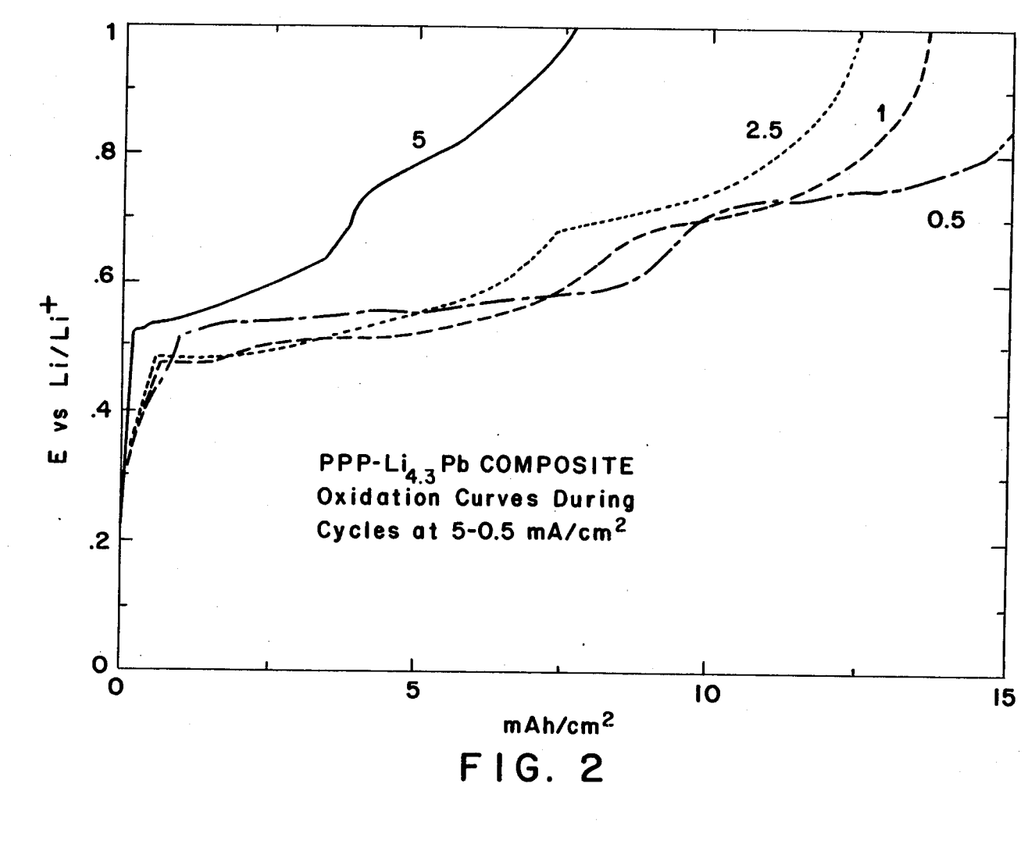
FIG. 2 is a graph of voltage vs. capacity for the battery of Example II at discharge rates of 0.5, 1.0, 2.5 and 5 mA/cm$^2$.
Figure 3:
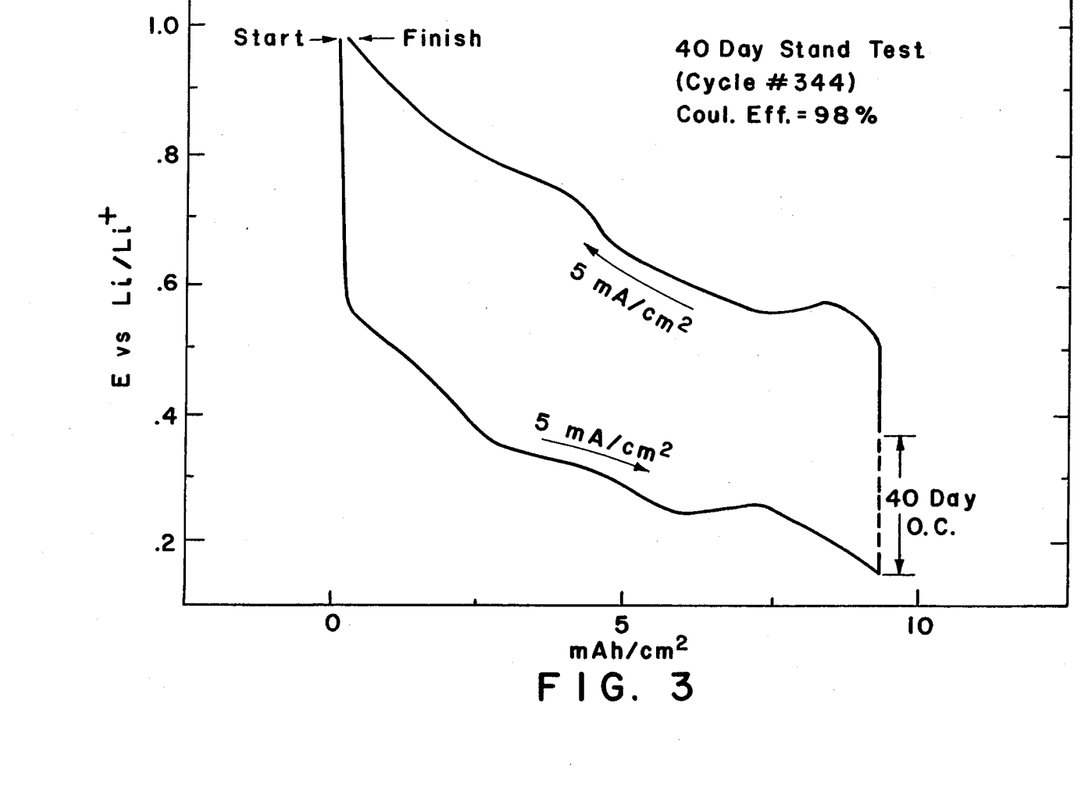
FIG. 3 is a graph of voltage vs. capacity for the battery of Example II for the 344th cycle with a 40-day wait between charge and discharge (dashed line).

A 1.02 $cm^2$ sample of the compressed film was assembled as the working electrode in an electrochemical cell with a similar composite film counter electrode, a Li metal reference electrode, and an electrolyte of 1.5 $LiPF_6$ in 2-methyltetrahydrofuran (2-MTHF). The cell was cycled at constant current 345 times at rates between 1 and 10 mA/$cm^2$ such that the potential of the working electrode varied from 1.0 V to 0.15 V versus Li/Li+. In this voltage range, the working electrode had a theoretical capacity of 16.6 mAh, which corresponded to 270 mAh/g of composite or to 535 mAh/$cm^3$ of film. The cycling test illustrated that the actual capacity of the composite film anode is decreased very little by: 1. prolonged cycling (See FIG. 1), 2. increased rates up to 5 mA/$cm^2$ (See FIG. 2), and 3. standing in the charged (reduced) state up to 40 days (See FIG. 3).

EXAMPLE III

Lead powder (0.8 g, −325 mesh) and PPP (0.175 g) powder were combined in 1 g of a solution of EPDM in xylene (2.5% polymer by weight). The slurry was spread evenly on aluminum (Al) foil and allowed to dry. A second piece of Al foil was roughened with 400 grit emery paper, rinsed with acetone and dried. The dry composite film cast on the smooth foil was folded over both sides of the roughened Al foil and pressed at 1 metric ton per $cm^2$. The smooth foil was peeled away leaving the composite film adhered to both sides of the rough foil.

A 1.36 $cm^2$ sample (0.020 cm thick) was assembled as a working electrode in a cell with a Na metal counter/reference electrode and 1.0M $NaPF_6$ in 1,2-dimethoxyethane (DME). The cell was cycled 6 times at 3 mA/$cm^2$ of working electrode in the voltage range of 1-0.05 V. The internal resistance of the cell, measured at 0.7 V during each oxidation, did not increase but actually decreased during cycling from 20 ohm to 6 ohm. This indicates that no gap formed between the foil and the active material either by grid corrosion or by loss of adhesion. The capacity remained essentially unchanged at 32 mAh which corresponded to 259 mAh/g and 1,168 mAh/$cm^2$ based on the weight and volume of the original film plus foil.

EXAMPLE IV $Li_{4.3}$Pb powder (0.8 g, −200 mesh) and PPP (0.175 g) powder were mixed into 0.5 g of a solution of poly(isobutylene) in cyclohexane (5.0% polymer by weight). The slurry was spread over a nickel (Ni) grid on a Teflon ® plate and allowed to dry. The resulting film was compressed between a steel plate and steel roller.

A 1.06 $cm^2$ sample was assembled as a working electrode in a cell with a Li metal counter/reference electrode and as electrolyte of 1.5M $LiPF_6$ in 2M THF. The cell was cycled 7 times over a voltage range of 1.0 and 0.2 V at a rate of 1.0 mA/$cm^2$. A capacity of 6.0 mAh corresponding to a utilization of 2.6 to 2.0 electrons per Pb was achieved.

COMPARATIVE EXAMPLE I

Poly(p-phenylene) (PPP) 25 weight percent (w/o) was well mixed with $Na_{3.75}Pb$ 66 (w/o). The polyethylene fiber 9 (w/o) was added and mixed with the above mixture. The final mixture was then spread on Ni expanded metal and hot rolled at about 130° C. to form an electrode. The dimensions of this electrode were $2 \times 0.7 \times 0.030$ $cm^3$ (including the Ni expanded metal).

This electrode was cycled against sodium in $NaPF_6$/DME solution. This electrode achieved a capacity of 8 mAh/$cm^2$ (cycled between 0.07 and 0.6 V) at at rate of 0.5 mA/$cm^2$. Based on the dimensions and weight of this electrode, the capacity was 267 mAh/$cm^3$ or 190 mAh/g. The electrode showed good capacity when extracting Na+ *after insertion at a low rate* (0.5 mA/$cm^2$). However, when insertion was performed at a rate of 4 mA/$cm^2$, only 5% of the capacity observed at low rate could be obtained. As compared to the electrode of EXAMPLE I, the electrode of COMPARATIVE EXAMPLE I had a lower capacity, a lower rate capacity in both cation insertion and extraction processes and a lower coulombic efficiency. When disassembled, the electrode was swollen and the electrode active material fell apart and easily separated from the Ni expanded metal support when probed with a spatula.

What is claimed is:

1. A battery comprising:
   (a) an anode comprising one or more particulate anode active materials selected from the group consisting of conjugated backbone polymers, alkali metals, alloys of alkali metals and alkali metal cation inserting materials dispersed in an elastomeric binder;
   (b) an electrolyte comprising an organic solvent and an alkali metal salt, and
   (c) a cathode;
   said alkali metal cations from said electrolyte being incorporated into said anode as a metal alloy or as an inserted ion in said alkali metal cation inserting material or said conjugated polymer during the charging of said battery.

2. The battery of claim 1 wherein said elastomeric material is selected from the group consisting of hydrocarbon elastomers, polyethers, aliphatic polyesters, and copolymers of ethylenically unsaturated ethers, esters, and ketones.

3. The battery of claim 2 wherein said elastomeric material is selected from the group consisting of hydrocarbon elastomers and polyether elastomers.

4. The battery of claim 3 wherein said elastomeric material is selected from the group consisting of hydrocarbon elastomers.

5. The battery of claim 4 wherein said hydrocarbon elastomers include crosslinkable moieties.

6. The battery of claim 5 wherein said moieties are double bonds in the polymeric backbone or pendant double bonds.

7. The battery of claim 6 wherein said hydrocarbon elastomers are selected from the group consisting of polymers or copolymers of diene monomers.

8. The battery of claim 7 wherein said diene monomers are selected from the group consisting of substituted or unsubstituted 1,3-butadiene.

9. The battery of claim 9 wherein said hydrocarbon elastomers are selected from the group consisting of copolymers formed by copolymerization of one or more olefins and one or more 1,3-butadienes.

10. The battery of claim 9 wherein said hydrocarbon elastomer is ethylene/propylene/butadiene copolymer.

11. A battery of claim 1 wherein said anode comprises one or more conjugated backbone polymers and one or more electroactive materials selected from the group consisting of metals which alloy with alkali metals and alkali metal cation inserting materials dispersed in an elastomeric binder.

12. The battery of claim 11 wherein said conjugated polymer is reduced (n-doped) during the charging of said battery.

13. The battery of claim 11 wherein said conjugated backbone polymer of said anode is polyacetylene, poly(p-phenylene) or poly(p-phenylene vinylene).

14. The battery of claim 13 wherein said polymer is polyacetylene or poly(p-phenylene).

15. The battery of claim 11 wherein said alkali metal salt of said electrolyte is a lithium salt, sodium salt or mixture thereof 16. The battery of claim 11 wherein said material is a metal.

17. The battery of claim 15 wherein said metal is aluminum, lead, tin, antimony, bismuth, magnesium, indium, gallium, cadmium, silicon or alloys thereof.

18. The battery of claim 11 wherein said metal is aluminum, lead, tin or tin-lead alloys.

19. The battery of claim 18 wherein said metal salt is a lithium salt and said metal is aluminum or lead.

20. The battery of claim 18 wherein said metal salt is a sodium salt and said metal is lead, tin or lead-tin alloys.

21. The battery of claim 11 wherein said material is an alkali metal ion inserting material.

22. The battery of claim 20 wherein said material is a transition metal chalcogenide.

23. The battery of claim 21 wherein said transition metal chalcogenide is selected from the group consisting of $TiS_2$, $MoO_2$, $WO_2$, $FeCuS_2$, $VSe_2$ and $VS_2$.

24. The battery of claim 21 wherein said chalcogenide is $TiS_2$ or $WO_2$.

25. The battery of claim 11 wherein said anode comprises:
   from about 9 to about 98 percent by weight of said polymer;
   from about 1 to about 90 percent by weight of said other electroactive material; and
   from about 1 to about 5 percent by weight of said elastomeric binder;
   wherein said weight percents are based on the total weight of polymer, material and binder.

26. The battery of claim 25 wherein said anode comprises:
   from about 12 to about 35 percent by weight of said polymer;
   from about 60 to about 86 percent by weight of said other electroactive material; and
   from about 2 to about 5 percent by weight of elastomeric binder.

27. The battery of claim 25 wherein said anode comprises:
   from about 15 to about 22 percent by weight of said polymer;
   from about 74 to about 83 percent by weight of said other electroactive material; and
   from about 2 to about 4 percent by weight of said elastomeric binder.

* * * * *